United States Patent [19]
Mough

[11] Patent Number: 5,653,456
[45] Date of Patent: Aug. 5, 1997

[54] SKI SYSTEM FOR ICE FISHING SHANTIES

[76] Inventor: Bryan M. Mough, 15657 Flanagan, Roseville, Mich. 48066

[21] Appl. No.: 505,799

[22] Filed: Jul. 21, 1995

[51] Int. Cl.$^6$ .................................................. B62B 13/00
[52] U.S. Cl. ........................ 280/19.1; 280/28.12; 280/13; 135/901
[58] Field of Search ................................ 280/7.14, 8, 10, 280/607, 16.18, 845, 13, 18, 19.1, 28.12; 135/901

[56] References Cited

U.S. PATENT DOCUMENTS

| | | | |
|---|---|---|---|
| 910,206 | 1/1909 | Karssen | 280/13 |
| 2,024,423 | 12/1935 | Brunetti | 280/8 |
| 2,464,884 | 3/1949 | Noyes . | |
| 3,464,735 | 9/1969 | Smith | 280/24 |
| 3,570,507 | 3/1971 | Kashuba | 135/901 |
| 3,854,746 | 12/1974 | Flynn et al. | 280/19.1 |
| 3,885,803 | 5/1975 | Christian | 280/8 |

(List continued on next page.)

OTHER PUBLICATIONS

"Portable Ice Fishing Shelters" Brochure of Frabill, Inc. of Allenton, WI 53002 Dated at Least as Early as Dec. 1994, Believed Before Jul. 1994.

"Pop 'N' Fish Spacesaver" Fact Sheet of FOF, Inc. of Delavan, WI 53115 Dated at Least as Early as Dec. 1994, Believed Before Jul. 1994.

"The Northwinds 3–Person Ice fishing Shelter" Fact Sheet of Sno–Boat Co., Edgerton, WI 53534 dated 1993.

(List continued on next page.)

*Primary Examiner*—Brian L. Johnson
*Assistant Examiner*—Min Yu
*Attorney, Agent, or Firm*—Peter D. Keefe

[57] ABSTRACT

A ski system for ice fishing shanties is composed of at least two ski members and a plurality of mounting brackets connected with the underside of the floor of the ice fishing shanty which engage the ski members in a selectively removable manner. Each ski member includes a substantially flat elongated ski body and a shovel connected thereto at an incline of approximately between fifty and fifty-five degrees with respect thereto. Each ski member further includes at least two legs projecting perpendicularly with respect to the top side of the elongated ski body. Each leg has a distal top end to which is attached a lip. The lip projects substantially parallel with the elongated ski body toward the tail end thereof. The mounting brackets are spaced and dimensioned to receive, respectively, each of the lips, thereby releasably securing the ski members to the ice fishing shanty. Each leg is provided with an axle hole substantially adjacent the elongated ski body, which passes from the left to the right side thereof. An axle is respectively passed through each axle hole and a wheel is secured to each side of the axle. The wheels have a diameter such that the periphery thereof extends to just beyond the bottom side of the elongated ski body.

19 Claims, 2 Drawing Sheets

U.S. PATENT DOCUMENTS

| | | |
|---|---|---|
| 3,971,395 | 7/1976 | Lipinski . |
| 4,114,295 | 9/1978 | Schaefer ............................... 280/11.19 |
| 4,244,593 | 1/1981 | Malone . |
| 4,533,151 | 8/1985 | Maitland ................................. 280/8 |
| 4,589,668 | 5/1986 | Mares ..................................... 280/8 |
| 4,631,877 | 12/1986 | Molodecki . |
| 4,863,075 | 9/1989 | Romer ..................................... 280/8 |
| 4,926,893 | 5/1990 | Klopfenstein et al. . |
| 5,174,591 | 12/1992 | Shappell . |
| 5,222,748 | 6/1993 | Johnson ................................. 280/19.1 |
| 5,251,921 | 10/1993 | Daniels ................................. 280/28.12 |
| 5,328,192 | 7/1994 | Thompson . |
| 5,531,462 | 7/1996 | Gu ......................................... 280/11.22 |

OTHER PUBLICATIONS

"Windblock Portable Ice Fishing Shelter" Brochure of Roth Enterprises, Inc., Edwardsburg, MI 49112 Dated at Least as Early as Dec. 1994, Believed Before Jul. 1994.

"Winter Ice Fishing Systems" Brochure and Fact Sheet of USL Products, Inc. Minneapolis, MN 55447 Dated at Least as Early as Dec. 1994, Believed Before Jul. 1994.

"The Trophy Portable Ice Fishing House" Brochure of Superior Products, Inc. Grand Ripids, MN 55744 Dated at Least as Early as Dec. 1994, Believed Before Jul. 1984.

"MinuteMan Portable Ice Fishing Shelters" Brocure Including Fact Sheets on #3000 and #4000 Shelters by Shappell Corp., Lansing MI 48906 Dated at Least as Early as Dec. 1994.

Instructions for "MinuteMan Portable Ice Fishing Shelter of Shappel Corp.", Lansing MI 48906 Dated at Least as Early as Dec. 1994, Believed Before Jul. 1994.

"Viking Ice Fishing Shelter" Brochure of K. L. Industries, Inc. Muskegon, MI 49444 dated 1992.

Windblock™ Portable Ice Fishing Shelter Advertisement of Roth Enterprises, Edwardsburg, MI, at page 80 of *In–Fisherman* date unknown, but believed before Jul. 1994.

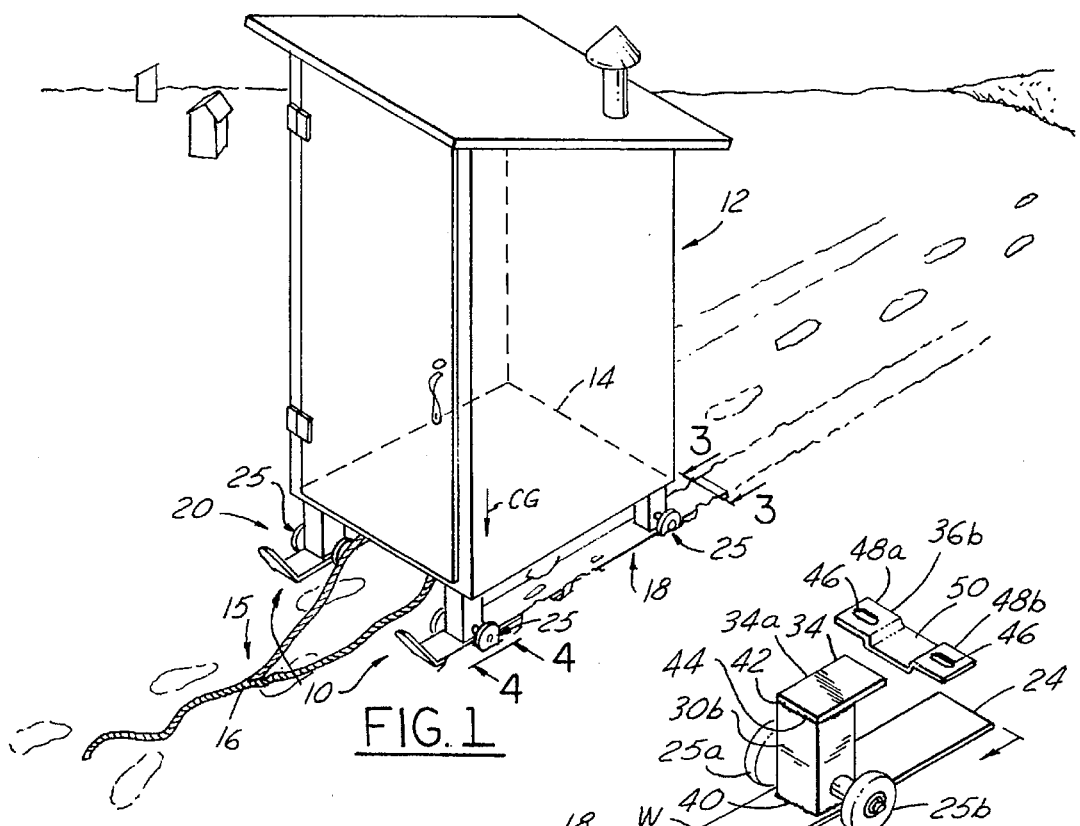
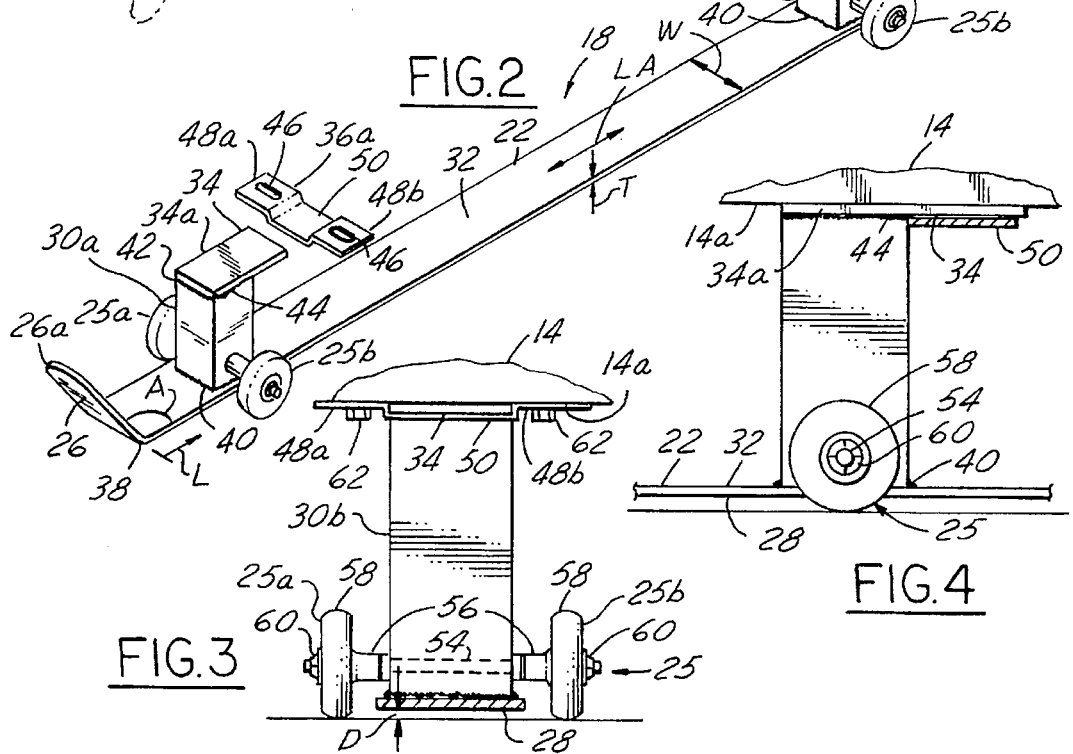

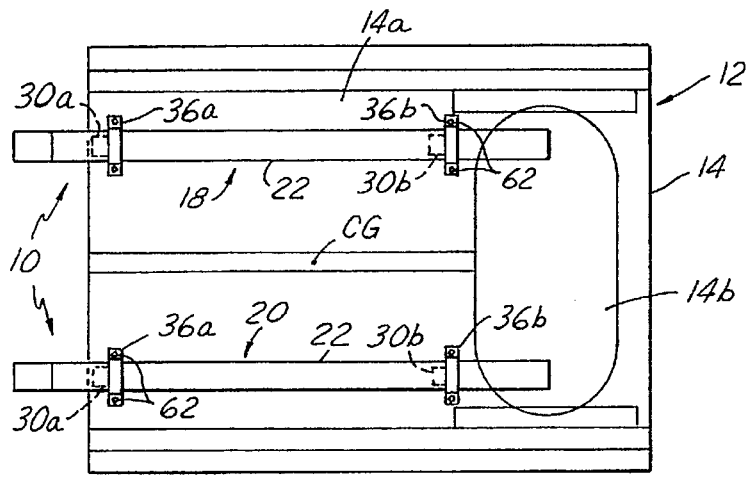
FIG.5
FIG.6A
FIG.6B
FIG.6C
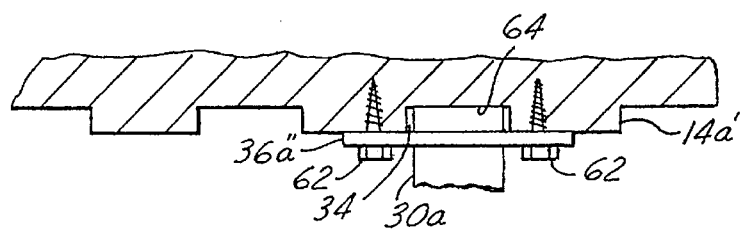
FIG.7
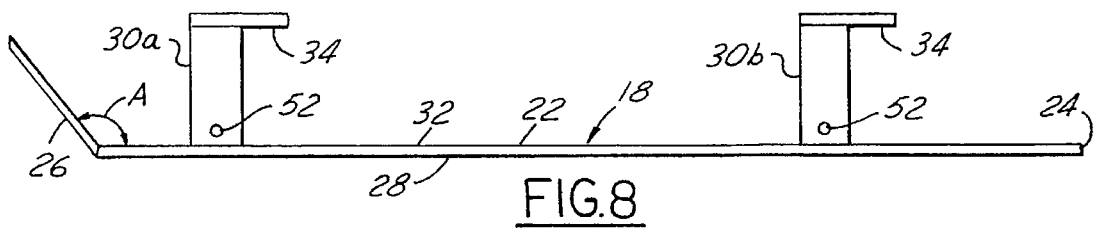
FIG.8
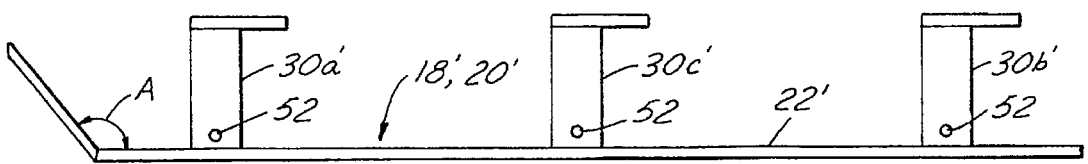
FIG.9

SKI SYSTEM FOR ICE FISHING SHANTIES

BACKGROUND OF THE INVENTION

1. Field of the Invention

The present invention relates to skis located on the bottom of ice fishing shanties which enable them to be slid over ice or snow covered terrain. More particularly, the present invention relates to a ski system for ice fishing shanties which is easily installable, is rugged, may accommodate dry terrain, as well as snow or ice covered terrain, and is easily mountable and dismountable from the ice fishing shanty.

2. Description of the Prior Art

Ice fishing shanties serve as enclosures inside of which an ice fisherman is at least partly protected from harsh weather conditions encountered at ice level of a frozen body of water. Home-made ice fishing shanties are usually constructed of wood, whereas commercially available ice fishing shanties are usually constructed of a metallic frame over which is placed a canvas or plastic enclosure. Ice fishing shanties have a floor, which in the home-made case is usually composed of wood, and in the commercial case is usually composed of plastic. The floor is provided with one or more holes through which the fisherman can access one or more holes that he has provided in the ice of a frozen body of water.

Ice fisherman are confronted with the problem of transporting their ice fishing shanty to a selected location upon a frozen body of water. In this regard, the ice fisherman must frequently drag his ice fishing shanty across the surface of plowed parking areas, across snowless land and then across the surface of the frozen body of water. Since the ice fishing shanty may have accessories with it, such as a heater, chairs, a tackle box, etc., the ice fishing shanty can be of considerable weight for the ice fisherman to drag.

Because of this acknowledged dragging difficulty, some ice fishing shanties have been equipped with skis for facilitating dragging of the ice fishing shanty. Examples of ice fishing shanties equipped with skis are described in U.S. Pat. Nos. 4,926,893, 4,631,877, 3,971,395, and 2,464,884. However, it yet remains a problem in the art to provide removable skis which are rugged and yet very easily removed from the ice fishing shanty upon arrival at the selected location for ice fishing. It yet further remains a problem in the art for ice fishing shanties to be dragged across various kinds of terrain which can range from dry asphalt, concrete, or gravel, to snow and ice: skis alone cannot assist the fisherman accomplish this feat,

SUMMARY OF THE INVENTION

The present invention is a ski system for ice fishing shanties which facilitates sliding over various kinds of terrain, ranging from dry asphalt, concrete, or gravel, to snow and ice, and which further is rugged, is easily installed, and is very easily removed from the ice fishing shanty at the selected ice fishing location on a frozen body of water.

The ice fishing shanty ski system according to the present invention is composed of at feast two ski members and a plurality of mounting brackets connected with the underside of the floor of the ice fishing shanty which engage the ski members in a selectively removable manner. Each ski member includes a substantially flat elongated ski body and a shovel connected thereto at an incline preferably of approximately between fifty and fifty-five degrees with respect thereto. Each ski member further includes at least two legs projecting perpendicularly with respect to the top side of the elongated ski body. Each leg has a distal end to which is attached a lip. The projects substantially parallel with the elongated ski body toward the end thereof. In this regard, the mounting brackets are spaced and dimensioned to receive, respectively, each of the lips, thereby releasably securing the ski members to the ice fishing shanty. Preferably, each leg is body, which passes from the left to the right side thereof. An axle is respectively passed through each axle hole and a wheel is secured to each side of the axle. The wheels have a diameter such that the periphery thereof extends to just beyond the bottom side of the elongated ski body.

In operation, the fisherman will have already installed the mounting brackets onto the underside of the ice fishing shanty, thereafter, he tips one side of the ice fishing shanty sufficiently to enable the lips of one of the ski members to be received by the mounting brackets provided therefor. He then tips the other side of the ice fishing shanty sufficiently to enable the lips of the other ski member to be received by the mounting brackets provided therefor. Now he pulls a rope or other pulling member attached to the ice fishing shanty to thereby cause the ice fishing shanty to slide. On dry land, the wheels will provide relief from frictional drag which would otherwise be present if only the bottom side of the elongated ski bodies of the ski members were present. And, on ice or snow, the wheels have a sufficiently small diameter that they do not impede sliding of the ski members relative thereto. Upon arrival at the selected ice fishing location, the fisherman again successively tilts the ice fishing shanty, this time removing the ski members from engagement with the mounting brackets.

Accordingly, it is an object of the present invention to provide a ski system for ice fishing shanties which is easily connected with respect to the underside of an ice fishing shanty, is rugged, and the ski members thereof are easy to mount and dismount.

It is an additional object of the present invention to provide a ski system for ice fishing shanties which affords easy sliding movement on slippery terrain such as mud, snow and ice, as well as wheeled movement on dry terrain such as concrete, asphalt and dirt.

It is another object of the present invention to provide a ski system for ice fishing shanties which is adaptable for retrofit onto a wide range of existing conventional ice fishing shanties.

These, and additional objects, advantages, features and benefits of the present invention become apparent from the following specification.

BRIEF DESCRIPTION OF THE DRAWINGS

FIG. 1 is a perspective view of an ice fishing shanty equipped with the ski system according to the present invention.

FIG. 2 is a perspective view of a portion of the ski system according to the present invention, showing one ski member thereof and the mounting brackets therefor.

FIG. 3 is a partly sectional view of a ski member and mounting bracket according to the present invention, seen along line 3—3 in FIG. 1.

FIG. 4 is a partly sectional view of a ski member and mounting bracket according to the present invention, seen along line 4—4 in FIG. 1.

FIG. 5 is a bottom plan view of an ice fishing shanty equipped with the ski system according to the present invention.

FIGS. 6A through 6C show front views of several preferred mounting brackets according to the present invention.

FIG. 7 is a detail, partly sectional front view of an ice fishing shanty equipped with the ski system according to the present invention, where a mounting bracket as shown in FIG. 6C is used.

FIG. 8 is a side view of a first preferred form of ski member of the the ski system according to the present invention.

FIG. 9 is a side view of a second preferred form of ski member of the the ski system according to the present invention.

DETAILED DESCRIPTION OF THE PREFERRED EMBODIMENT

Referring now to the Drawing, an overview of the ski system 10 according to the present invention can be understood by reference to FIGS. 1 through 4. FIG. 1 shows the ski system 10 in operation with respect to an ice fishing shanty 12. The ski system 10 is located at the underside 14a of the floor 14 of the ice fishing shanty 12 so that it provides a structure whereby the ice fishing shanty 12 is raised above the terrain 15 and may be moved thereacross by a fisherman using a pull rope 16, or the like, which is, itself, secured to the ice fishing shanty. The ski system 10 includes at least two mutually spaced apart ski members, a pair ski members 18, 20 being preferred. Each of the ski members 18, 20 is composed of an elongated ski body 22 having a tail end 24 at one end and a shovel 26 connected thereto at the other end. The bottom side 28 of the elongated ski body 22 provides a sliding interface with the terrain 15, while the shovel 26 provides an inclined interface for encountering raised areas of uneven terrain as the ice fishing shanty 12 is pulled. Each of the ski members 18, 20 includes at least two mutually spaced apart fore and aft legs 30a, 30b that are connected with the top side 32 of the respective elongated ski body 22 thereof. Each of the legs 30a, 30b is provided at the distal end thereof with a lip 34. The ski system 10 further includes fore and aft mounting brackets 36a, 36b secured to the underside 14a of the floor 14 of the ice fishing shanty 12, wherein the lip 34 of the fore leg 30a is slidingly receivable into the fore mounting bracket and the lip 34 of the aft leg 30b is slidingly receivable into the aft mounting bracket. It will be further noted that each of the ski members 18, 20 optionally includes wheel sets 25 for interfacing with non-slippery terrain, such as dirt or the asphalt or concrete surface of a parking lot.

A more complete description of the structure and function ski system 10 will now be presented hereinbelow, with reference being additionally directed to remaining FIGS. 5 through 9.

Each ski member 18, 20 has an elongated ski body 22 formed preferably from flat sheet metal stock. An example of acceptable dimensions of the elongated ski body 22 is shown in FIG. 2, wherein the thickness T is about one-eighth inch, the width W is about two and one-half inches, and the length L is about forty-two inches. Other dimensions and other materials may be substituted, the foregoing merely describing a preferred example. The shovel 26 is preferably integrally formed with the elongated ski body 22 by a bend 38 being provided in the material composing the shovel and the elongated ski body. An example of an acceptable bend 38 has an angle A of about between fifty and fifty-five degrees with respect to the top side 32 of the elongated ski body 22, fifty-three degrees being preferred. A preferable length of the shovel 26 is about six inches. Preferably, the nose 26a of the shovel 26 is rounded. The bottom side 28 of the elongated ski body 22 is structured for sliding along terrain, which structure may be any selected structure known in the ski art, including a snow covered ground surface as depicted in FIG. 3.

The fore leg 30a and the aft leg 30b are connected, such as by welding 40, to the top side 32 of the elongated ski body 22, wherein each of the fore and aft legs 30a, 30b are oriented perpendicular to the top side 32. By way of example, each of the fore and aft legs 30a, 30b are preferred to be composed of square cross-section metal tubing, having for example sides of about two inches in width, a wall thickness of about one-eighth inch, and a height of about five inches. Other cross-sections and dimensions, such as for example a round cross-section, may also be used for the fore and aft legs.

At the distal end 42 of each of the fore and aft legs 30a, 30b, a lip 34 is provided. In this regard, the lip 34 projects parallel with the elongated ski body 22 toward the tail end 24 thereof. Preferably, the each lip 34 projects about two inches from the respective fore or aft leg. By way of preferred example, each lip 34 is formed of a plate 34a of metal stock which is connected, such as by welding 44, to a respective distal top end 42 of each of the fore and aft legs, wherein each plate has a one-quarter inch thickness, a width about equal to the cross-section of the respective fore or aft leg (the width being two inches in the case of the above recounted preferred fore and aft leg cross-section), and a length (as measured in the direction of the longitudinal axis LA of the elongated ski body, which is, itself, defined by a line extending from the shovel to the tail end) about equal to the cross-section of the respective fore or aft leg plus the lip formed thereof projecting two inches (the length being four inches in the case of the above recounted preferred fore and aft leg cross-section). Preferably, the location of the fore and aft legs 30a, 30b on the elongated ski body 22 is longitudinally determined to provide that the center of gravity CG of the ice fishing shanty will fall well inside the space between the fore and aft legs, as depicted in FIG. 1; the fore and aft legs are laterally centered on the elongated ski body, as depicted in FIG. 3.

As depicted in FIG. 6A, each of the fore and aft mounting brackets 36a, 36b is composed of sheet metal stock (preferably 13 gauge) being for example one inch wide and six and one-quarter inches long. An elongated fastener hole 46 is provided at each end portion 48a, 48b thereof. The central portion 50 of each of the fore and aft mounting brackets 36a, 36b is stamped to provide a relief offset 50a (for example, twenty-eight hundredths inch per the above dimensional example) from the end portions 48a, 48b that is at least about equal to the thickness of the lips 34. Further, the central portion 50 extends between the end portions 48a, 48b sufficiently (for example, two and one eighth inches per the above dimensional example) to allow a respective lip to be received into the offset of the central portion. Thus, each lip 34 is slidingly receivable into the offset at the central portion 50 of respective fore and aft mounting brackets 36a, 36b, as can be discerned from reference to FIGS. 3 and 4.

As shown in FIG. 8, an axle hole 52 is preferably provided in each of the fore and aft legs 30a, 30b, wherein the axle hole is perpendicular to the longitudinal axis of the elongated ski body 22. Each axle hole 52 permits an optional wheel set 25 (see FIG. 3) to be connected thereat with each of the ski members 18, 20. As shown in FIG. 3, each wheel set 25 is composed of an axle 54, a first wheel 25a and a second wheel 25b, each wheel being rotatably mounted on projecting portions of the axle at either side of a respective fore or aft leg. Spacer washers 56 are placed on the axle 54 adjacent the respective fore or aft leg to position the wheels so that they do not rub against the elongated ski body 22. The cross-section of each of the wheels 25a, 25b is such that the periphery 58 thereof extends a short distance D beyond the bottom side 28 of the elongated ski body 22, as depicted in FIGS. 3 and 4, so as to provide a rolling interface with nonslippery terrain, yet not cause undue resistance on snowy terrain (as shown in FIG. 1). That is, the periphery 58 of each wheel 25a, 25b has a point of maximum perpendicular displacement from the elongated ski member 22 at said bottom side 28 thereof which is substantially proximate the bottom side. An example of a preferred wheel has a peripheral cross-section of about one and three-quarter inches, a width of about one-half inch and a peripheral maximum perpendicular displacement D of about one-half inch. It is preferred for the wheels 25a, 25b to be held in position on the respective axle 54 via a press-fitting, self-locking washer 60 which is one-way slidable onto the axle after the wheels 25a, 25b are in place thereon.

As shown in FIG. 5, the fore and aft mounting brackets 36a, 36b are located on the underside 14a of the floor 14 of the ice fishing shanty 12. In this regard the access opening 14b in the floor 14 is taken into account when locating the fore and aft mounting brackets. Depending upon the type and thickness of the material of the floor 14, bolts or screws 62 are used to fasten the end portions 48a, 48b of the fore and aft mounting brackets 36a, 36b into abutting relation to the underside 14a of the floor 14 (wherein the central portion 50 is spaced from the underside by the offset).

It should be noted that the connection of the fore and aft mounting brackets 36a, 36b to the underside 14a of the floor 14 of the ice fishing shanty 12 is such that when the lips 34 are respectively received thereinto, each elongated ski body 22 is oriented parallel with respect to a direction of pull defined by the pull rope 16. Also, the location of the fore and aft legs 30a, 30b and the location of the ski members 18, 20 relative to the ice fishing shanty 12 is such as to provide for said ice fishing shanty to be stably supported on the ski system 10.

In operation, the fisherman first installs the fore and aft mounting brackets to the underside of the floor of the fishing shanty using bolts, screws and the like. The fore and aft mounting brackets are located so that the lips of the respective ski member is slidably receivable into the offset at the central portion thereof (that is, between the underside and the central portion).

Next, the fisherman connects the ski members to the ice fishing shanty by sliding the lips thereof into respective fore and aft mounting brackets. To do this the ice fishing shanty may be placed on its side, or it can be tipped successively one way and then the other to allow the ski members to be successively mounted.

The fisherman then drags the ice fishing shanty using a pull rope or the equivalent which is connected with the ice fishing shanty, preferably at or near the floor thereof. In this regard, the fore and aft legs will abut, respectively, the fore and aft mounting brackets so that as the ice fisherman pulls on the pull rope of the ice fishing shanty, the ski members will move therewith. In this regard further, the wheel sets will allow for rolling engagement with nonslippery terrain, while the bottom side of the elongated ski body will slidingly engage slippery terrain. In this regard still further, the shovel of each of the ski members will allow for the ski members to slidingly encounter uneven terrain and slide thereover, while the wheels offer very little resistance to the sliding movement, Upon arrival at the selected fishing site upon a frozen body of water, the fisherman tilts the ice fishing shanty to successively take weight off the ski members so that the lips thereof may be successively slipped from engagement with the fore and aft mounting members. Now the ice fishing shanty is lying upon the terrain of the frozen body of water in a manner that is resistant to slippage due to wind. When it comes time to end fishing, the fisherman simply reinstalls the ski members by re-engaging the lips onto the fore and aft mounting members, and then again pulls on the pull rope.

FIGS. 6B and 6C depict mounting brackets which are modified from that depicted in FIG. 6A so as to accommodate the underside of floors of certain commercially made ice fishing shanties. For example, FIG. 6B depots a mounting bracket 36a' having a central portion 50' that is dimensioned like that of the mounting bracket 36a shown in FIG. 6A, but the end portions 48a', 48b' thereof are not as long since the fastener holes 46' are not elongated, but round. Further for example, FIG. 6C depicts a mounting bracket 36a" which is flat and has two elongated fastener holes 46'. The mounting bracket 36a' of FIG. 6C is intended to span a groove already present in a corrugated floor underside 14a' of an ice fishing shanty, wherein, as shown in FIG. 7, the corrugation grooves 64 receive the lips 34.

FIG. 9 depicts a modified ski member 18', 20', wherein the elongated ski body 22' is now about sixty-six inches long and a middle leg 30c is located between the fore and aft legs 30a', 30b'. In this variation, the lip 34 of each leg is received into a respective mounting bracket, of which there are now three for each ski member 18', 20'. Operation of the modified ski member 18', 20' is analogous to that described hereinabove.

To those skilled in the art to which this invention appertains, the above described preferred embodiment may be subject to change or modification. For example, rather than wheel sets, single wheels may be installed, wherein one wheel is placed on one side of the fore leg, then another wheel is placed at the opposite side of the aft leg. Such change or modification can be carried out without departing from the scope of the invention, which is intended to be limited only by the scope of the appended claims.

What is claimed is:

1. A ski system for being connected to a floor of an ice fishing shanty, the floor having an underside, said ski system comprising:

at least two ski members, each ski member comprising:
      an elongated ski body having a top side, a bottom side, and a tail end;
      a shovel connected with said elongated ski body opposite said tail end thereof;
      a fore leg connected with said top side of said elongated ski member, said fore leg having a distal top end;
      an aft leg connected with said top side of said elongated ski member, said aft leg having a distal top end, said aft leg being separated from said fore leg by a predetermined distance;
      a first lip connected with said distal top end of said fore leg, said first lip projecting from said fore leg substantially parallel with respect to said elongated ski body in a direction toward said tail end; and
      a second lip connected with said distal top end of said aft leg, said second lip projecting from said aft leg substantially parallel with respect to said elongated ski body in a direction toward said tail end; and
   mounting bracket means for being connected with an underside of a floor of an ice fishing shanty to thereby provide an offset at the floor underside for slidingly receiving thereinto said first and second lips to thereby releasably mount said fore and aft legs to the ice fishing shanty;

whereby mounting and mounting of said ski members with respect to said mounting bracket means is accomplished free of fasteners by simply sliding said first and second lips with respect to said mounting bracket means.

2. The ski system of claim 1, wherein said shovel is oriented at an angle of substantially between fifty and fifty-five degrees with respect to said top side of said elongated ski member.

3. The ski system of claim 1, wherein each said ski member further comprises:

a middle leg connected with said top side of said elongated ski member, said middle leg having a distal top end, said middle leg being located between and mutually separated from said fore and aft legs;

a third lip connected with said distal top end of said middle leg, said third lip projecting from said middle leg substantially parallel with respect to said elongated ski body in a direction toward said tail end; and where said mounting bracket means further provides for an offset at the underside of the floor for slidingly receiving thereinto said third lip to thereby releasably mount said fore, middle and aft legs to the ice fishing shanty.

4. The ski system of claim 1, further comprising wheel means connected with said fore and aft legs for providing rolling engagement with terrain adjacent said bottom side of said elongated ski member.

5. The ski system of claim 4, wherein said wheel means comprises a wheel set connected, respectively, with each of said fore and aft legs, wherein each wheel set comprises a par of wheels, each wheel thereof having a periphery, said periphery having a point of maximum perpendicular displacement from said elongated ski member at said bottom side thereof which is substantially proximate said bottom side.

6. The ski system of claim 1, wherein said mounting means comprises:

a fore mounting bracket having a first central portion;

means for connecting said fore mounting bracket to the underside of the floor of the ice fishing shanty to thereby define a first offset for slidingly receiving thereinto said lip of said fore leg;

an aft mounting bracket having a second central portion; and means for connecting said aft mounting bracket to the underside of the floor of the ice fishing shanty to thereby define a second offset for slidingly receiving thereinto said lip of said aft leg.

7. The ski system of claim 6, further comprising wheel means connected with said fore and aft legs for providing rolling engagement with terrain adjacent said bottom side of said elongated ski member.

8. The ski system of claim 7, wherein said wheel means comprises a wheel set connected, respectively, with each of said fore and aft legs, wherein each wheel set comprises a pair of wheels, each wheel thereof having a periphery, said periphery having a point of maximum perpendicular displacement from said elongated ski member at said bottom side thereof which is substantially proximate said bottom side.

9. The ski system of claim 8, wherein said shovel is oriented at an angle of substantially between fifty and fifty-five degrees with respect to said top side of said elongated ski member.

10. The ski system of claim 9, wherein each said ski member further comprises:

a middle leg connected with said top side of said elongated ski member, said middle leg having a distal top end, said middle leg being located between and mutually separated from said fore and aft legs;

a third lip connected with said distal top end of said middle leg, said third lip projecting from said middle leg substantially parallel with respect to said elongated ski body in a direction toward said tail end; and wherein said mounting bracket means further provides for an offset at the underside of the floor for slidingly receiving thereinto said third lip to thereby releasably mount said fore, middle and aft legs to the ice fishing shanty.

11. An ice fishing shanty and ski system therefor comprising:

an ice fishing shanty comprising:

shelter means for providing shelter, said shelter means including a floor connected therewith, said floor having an underside; and pull rope means connected with said shelter means for enabling a person to pull thereupon; and a ski system connected with said underside, comprising:

two ski members, each ski member comprising:

an elongated ski body having a top side, a bottom side, and a tail end;

a shovel connected with said elongated ski body opposite said tail end thereof;

a fore leg connected with said top side of said elongated ski member, said fore leg having a distal top end;

an aft leg connected with said top side of said elongated ski member, said aft leg having a distal top end, said aft leg being separated from said fore leg by a first predetermined distance;

a first lip connected with said distal top end of said fore leg, said first lip projecting from said fore leg substantially parallel with respect to said elongated ski body in a direction toward said tail end;

a second lip connected with said distal top end of said aft leg, said second lip projecting from said aft leg substantially parallel with respect to said elongated ski body in a direction toward said tail end; and mounting bracket means connected with said underside for providing an offset at the underside for slidingly receiving thereinto said first and second lips to thereby releasably mount said fore and aft legs to the ice fishing shanty, wherein said two ski members are thereby mutually separated a second predetermined distance, and where each elongated ski body is oriented parallel with respect to a direction of pull defined by said pull rope means;

wherein said first and second predetermined distances provide for said ice fishing shanty to be stably supported on said ski system.

whereby mounting and dismounting of said ski member with respect to said mounting bracket means with respect to said mounting bracket means is accomplished free of fasteners by simply sliding said first and second lips with respect to said mounting bracket means.

12. The ice fishing shanty and ski system therefor of claim 11, wherein said shovel is oriented at an angle of substantially between fifty and fifty-five degrees with respect to said top side of said elongated ski member.

13. The ice fishing shanty and ski system therefor of claim 11, wherein each said ski member further comprises:

a middle leg connected with said top side of said elongated ski member, said middle leg having a distal top end, said middle leg being located between and mutually separated from said fore and aft legs;

a third lip connected with said distal top end of said middle leg, said third lip projecting from said middle leg substantially parallel with respect to said elongated ski body in a direction toward said tail end; and wherein said mounting bracket means further provides for an offset at the floor underside for slidingly receiving thereinto said third lip to thereby releasably mount said fore, middle and aft legs to the ice fishing shanty.

14. The ice fishing shanty and ski system therefor of claim 11, wherein said ice fishing shanty has a center of gravity, said center of gravity being located between said two ski members and between said fore and aft leg of each of said two ski members.

15. The ice fishing shanty and ski system therefor of claim 11, wherein said mounting means comprises:

a fore mounting bracket having a first central portion;

means for connecting said fore mounting bracket to the underside of the floor of the ice fishing shanty to thereby define a first offset for sliding receiving said lip of said fore leg;

an aft mounting bracket having a second central portion;

means for connecting said aft mounting bracket to the underside of the floor of the ice fishing shanty to thereby define a second offset for slidingly receiving said lip of said aft leg.

16. The ice fishing shanty and ski system therefor of claim 11, further comprising wheel means connected with said fore and aft legs for providing rolling engagement with terrain adjacent said bottom side of said elongated ski member.

17. The ice fishing shanty and ski system therefor of claim 16, wherein said wheel means comprises a wheel set connected, respectively, with each of said fore and aft legs, wherein each wheel set comprises a pair of wheels, each wheel thereof having a periphery, said periphery having a point of maximum perpendicular displacement from said elongated ski member at said bottom side thereof which is substantially proximate said bottom side.

18. The ice fishing shanty and ski system therefor of claim 17, wherein said mounting means comprises:

a fore mounting bracket having a first central portion;

means for connecting said fore mounting bracket to the underside of the floor of the ice fishing shanty to thereby define a first offset for slidingly receiving thereinto said lip of said fore leg;

an aft mounting bracket having a second central portion;

means for connecting said aft mounting bracket to the underside of the floor of the ice fishing shanty to thereby define a second offset for slidingly receiving thereto said lip of said aft leg.

19. The ice fishing shanty and ski system therefor of claim 18, wherein said shovel is oriented at an angle of substantially between fifty and fifty-five degrees with respect to said top side of said elongated ski member.

\* \* \* \* \*